(12) United States Patent
Brindyuk

(10) Patent No.: US 11,234,354 B2
(45) Date of Patent: Feb. 1, 2022

(54) METHOD FOR CULTIVATING SOWN CROPS AND APPARATUS FOR CARRYING OUT SAID METHOD (VARIANTS)

(71) Applicant: Sergei Vladimirovich Brindyuk, Belgorodskaya obl. (RU)

(72) Inventor: Sergei Vladimirovich Brindyuk, Belgorodskaya obl. (RU)

( * ) Notice: Subject to any disclaimer, the term of this patent is extended or adjusted under 35 U.S.C. 154(b) by 124 days.

(21) Appl. No.: 16/662,101

(22) Filed: Oct. 24, 2019

(65) Prior Publication Data

US 2020/0107484 A1 Apr. 9, 2020

Related U.S. Application Data

(63) Continuation of application No. PCT/RU2018/000238, filed on Apr. 18, 2018.

(30) Foreign Application Priority Data

Apr. 26, 2017 (RU) .......................... RU2017114814

(51) Int. Cl.
*A01B 51/04* (2006.01)
*A01B 49/06* (2006.01)
(Continued)

(52) U.S. Cl.
CPC .............. *A01B 51/04* (2013.01); *A01B 49/06* (2013.01); *A01B 79/005* (2013.01); *A01B 79/02* (2013.01)

(58) Field of Classification Search
CPC ....... A01B 51/04; A01B 49/06; A01B 79/005; A01B 79/02; A01B 51/00; A01B 49/04; A01B 49/00; A01B 79/00
See application file for complete search history.

(56) References Cited

U.S. PATENT DOCUMENTS 4,817,730 A 4/1989 Winter
5,689,906 A 11/1997 Dillman et al.
(Continued)

FOREIGN PATENT DOCUMENTS

DE 20201505859 U1 2/2017
EP 2583842 A1 4/2013
(Continued)

OTHER PUBLICATIONS

Supplementary European Search Report, EP18792246, dated Dec. 15, 2020, 9 pages.
(Continued)

*Primary Examiner* — Christopher J. Novosad
(74) *Attorney, Agent, or Firm* — Edell, Shapiro & Finnan LLC

(57) ABSTRACT

A method for increasing the efficiency of farming operations used in the production of sown crops. In the proposed method for cultivating sown crops, all bar none of the technological operations which are carried out in the field, beginning from pre-sowing preparation and ending with the gathering of a harvest, make use of a self-propelled power-operated technological device capable of functioning on tires having a super-low pressure of 5-60 kPa and/or with a pressure on the ground of less than 60 kPa. The proposed method is realized with the aid of a transport and technological system primarily for farming purposes, that utilizes a self-propelled power-operated vehicle on tires of super-low pressure operating among others at a pressure of 5 to 60 kPa and/or exerting a pressure of less than 60 kPa on the soil. This vehicle is equipped with a discharging device and/or a lifting device.

4 Claims, 2 Drawing Sheets

(51) Int. Cl.
  *A01B 79/00*  (2006.01)
  *A01B 79/02*  (2006.01)

(56) References Cited

U.S. PATENT DOCUMENTS

| 10,661,612 B2 | 5/2020 | Linzbach |
| 2013/0046419 A1 | 2/2013 | Anderson et al. |
| 2013/0046439 A1 | 2/2013 | Anderson et al. |

FOREIGN PATENT DOCUMENTS

| EP | 2929769 A1 * | 10/2015 | ............. A01B 79/02 |
| EP | 2989876 A2 * | 3/2016 | ............. A01C 5/062 |
| RU | 21187 U1 | 1/2001 | |
| RU | 2227966 C2 | 5/2004 | |
| RU | 2237987 C1 | 10/2004 | |
| RU | 2297126 C1 | 4/2007 | |
| RU | 2008105120 A * | 8/2009 | ............. A01B 79/00 |
| RU | 2374809 C2 * | 12/2009 | ............. A01B 79/02 |
| RU | 2378815 C2 | 1/2010 | |
| RU | 138947 U1 | 3/2014 | |
| RU | 2594532 C2 | 8/2016 | |
| WO | 2014028142 A1 | 2/2014 | |

OTHER PUBLICATIONS

International Search Report, PCT/RU2018/000238, dated Jul. 10, 2018, 3 pages.
Sineokov et al., Teoriia i raschet pochvoobrabatyvaiushchikh mashin. M. "Mashinostroenie" ("TEOPNR N PAC4ET"), 1977, Chapter 1 and Table of Contents, 21 pages.

* cited by examiner

METHOD FOR CULTIVATING SOWN CROPS AND APPARATUS FOR CARRYING OUT SAID METHOD (VARIANTS)

CROSS REFERENCE TO RELATED APPLICATIONS

This is a Continuation of International Application PCT/RU2018/000238, which has an international filing date of Apr. 18, 2018, and which claims the priority of Russian Patent Application 2017114814, filed Apr. 26, 2017. The disclosures of both applications are incorporated in their respective entireties into the present Continuation by reference.

FIELD OF THE INVENTION

The invention relates to agricultural production, particularly to the production of crops which are sown.

BACKGROUND

Recently, one of the problems of achieving high yields of good quality of crops is not only the problem of timely sowing thereof, moisture detention in the soil, weed control, but also the preservation and restoration of natural fertility of the soil.

Achieving high yields largely depends on the amount of moisture in the soil. The probable level of spring wheat yield depending on the depth of moisture permeation of the soil in spring is presented below (data from the Swift Current Experimental Station (Canada)):

| Depth of moisture permeation of the soil in spring, cm | Probability of achieving a yield, dt/ha [dt/ha = 100 kilograms per hectare] | |
|---|---|---|
| | more than 10 | more than 17 |
| 0-50 | 2: 10 | 0 |
| 50-68 | 3: 10 | 1: 10 |
| 68-82 | 6: 10 | 2: 10 |
| 82-112 | 7: 10 | 3: 10 |
| More than 112 | 9: 10 | 6: 10 |

As can be seen, the lack of moisture during the plant vegetation period significantly reduces the yield. In order to preserve and use moisture, it is necessary to optimize the timing of the activities, which is not possible with traditional technologies requiring that the soil reaches physical maturity and that the activities are performed thereafter, i.e. when the soil will be least resistant to mechanical processing. The relation of resistance to mechanical processing and soil moisture is apparent from the graph (see FIG. 4), where K is the resistance to mechanical processing and Wa is the absolute soil moisture.

When plowing dry soil (segment A-B) lumps with a diameter of up to 0.5 m and more are formed. When plowing oversaturated soil (segment C-D), there is strong adhesion and clumps and crusts of soil are formed in front of the soil processing assembly. This leads to an increase in the specific resistance of the soil and poor placement of plant residues, and most importantly reduces the natural fertility of the soil. Upon a further increase in moisture (segment D-E), water acts as lubricant and "$K_o$" decreases. However, the main existing types of soil processing and sowing assemblies are not capable of performing their functions with the required quality at high moisture. For traditional types of appliances, point C is the upper limit of physical maturity of the soil. It differs from soil type to soil type and ranges from 15 to 35% absolute moisture.

An example of typical, heavy loam chernozem ["black soil"]:

| Soil type, mechanical composition | Maximum field moisture capacity % | Moisture of capillary break, % | Moisture of wilting point | Physical maturity, % |
|---|---|---|---|---|
| Typical, heavy loam chernozem | 30-34 | 17-20 | 12-15 | 15-20 |

(see "Characteristics of water properties of soils" I. S. Kaurychev, 1989; V. P. Kovrigo, 2000)

It is clearly apparent that the onset of physical maturity of the soil coincides with the beginning of capillary break 17-20%, which leads to the beginning of lack of moisture in the plant.

Due to the disadvantages of the existing technologies, there is an inefficient waste of time while waiting for the physical maturation of the soil.

Within the high moisture range, sowing can be done by scattering, but this is seriously disadvantageous for most crops. If there is no rain or irrigation, scattered sowing can result in death of crop because the tiller node, e.g. of spring crops, will be on the surface in the zone lacking moisture. Seeds must be immersed in the soil at a depth of at least 0.5 cm.

It is known that at the first time the yield of virgin and fallow land is significantly higher than the yield of the same land in the following years. This is also due to the negative impact of agricultural production technologies on natural fertility, for example, due to compacting the soil. With the existing technologies of crop cultivation, the quantity of operations (number of machine passes) on one field fluctuates from 10-15 to 20-25 times. As a result, the compaction area is 2-3 times larger than the field area. For example, the compaction area of 1 ha upon cultivation of winter wheat is 22-26 thousand square meters. Only in spring, at three operations up to 84-91% of the field area are covered by passes of machine/tractor assemblies.

Soil compaction has a negative impact on water/physical properties. Porosity, water filtration and aeration are reduced, and conditions for the development of the root system of plants sharply deteriorate. As a result, crop yields are reduced by 10-30%. It was found in experiments of the Institute of Agriculture and the Institute of Mechanization and Electrification of the UAAS (1982-1985) that upon three passes of the tractor there was a decrease in yields: winter wheat grain by 4-18%, oats—2-13, green mass corn—by 4-14%. Sod-podzolic sandy loam soils are less resistant to machine compaction. Crop failure of barley grain due to compaction of these soils was 2.1-5.6 dt/ha (9-24%), on chernozems 1.7-4.6 dt/ha (4-12%) (Chernihiv experimental station). Soil compaction by agricultural machines in technological processes increases traction resistance by 10-17%, reduces productivity of the assemblies by 8-12% and deteriorates the quality of processing as a whole (A. M. Maliyenko, M. V. Kolomiets).

A method of producing crops, which includes loosening the soil, forming a ridge profile of the soil, sowing the seeds by laying and pressing with subsequent mulching, is known (see patent RU 2378815, IPC class A01C7/00, of 17 Apr. 2008).

A method of producing crops, which includes the operation of loosening the soil in autumn and spring, sowing seeds in the processed soil and compacting the sowing furrow, is known (see "Technology and technical means for the strip sowing of grass seeds in the turf" Recommendations of NIIKSH Severo-Vostoka Im. N. V. Rudnitskogo, Kirov, 2000—58c—prototype).

The general disadvantage of known methods lies in the low efficiency of agricultural activities, significant loss of soil moisture when it is loosened in spring, the difficulty of complying with the optimal agrotechnical seed sowing periods, due to the necessity of plowing in spring prior to sowing, which is practically impossible on physically immature soil. Moreover, even when working on physically mature soil with the existing, traditional agricultural assemblies with traditional power-operated vehicles, this leads to significant compaction of the soil, which negatively affects its fertility and yield of both sown crops and crops of the following agricultural period.

Agricultural assemblies are known (see patents RU 2227966 of 10 May 2004 or RU 2297126 of 20 Apr. 2007, IPC A01B49\06)

The general disadvantage of known apparatus lies in the lack of efficiency of agricultural sowing activities which are due to their low cross-country ability, their high mass and dimensions and the significant compaction of the soil cultivated by said apparatus.

An agricultural assembly is known (see patent RU 2594532 of 23 Apr. 2013, IPC A01B49\06—prototype). In said assembly, for instance a "Bars-271" apparatus is used as power-operated vehicle.

However, the known apparatus is only capable of performing single agricultural operations due to the lack of the necessary universal lifting-hitching device and also due to its low payload.

SUMMARY

One object of the proposed invention is to increase the efficiency of agricultural activities, namely:
reducing loss of the spring soil moisture reserves,
optimizing the periods of sowing activities,
obtaining strong shoots,
shifting the periods of sowing activities forward to an earlier period,
reducing the dependence of sowing activities on soil conditions,
increasing the environmental friendliness of agricultural production, and consequently of the produced crops,
reducing the negative impact of the agricultural assembly on the soil and of the soil on parts of the assembly,
increasing the speed of agricultural activities,
reducing the specific fuel consumption during the performance of agricultural activities,
increasing the payload of the agricultural assembly with minimal pressure on the soil,
expanding the functionalities of the agricultural assembly while performing activities with minimal pressure on the soil.

This object is solved in that in the known method for cultivating crops, including the technological operations of sowing and harvesting, according to one aspect of the invention, in all technological operations—without exception—performed on the field, starting from its preparation prior to sowing and ending with harvesting, a self-propelled power-operated vehicle is used which is capable of operating on tires having an ultra-low pressure of 5-60 kPa and/or with a pressure on the ground of less than 60 kPa (where 1 kg/cm$^2$ equals 98.0665 kPa).

Furthermore, it is possible to achieve said positive effect, albeit in slightly reduced form, by using the further variants of the proposed invention.

A further variant of the method for cultivating crops, including the technological operations of sowing and harvesting, in which according to the invention, in technological operations performed on the field, at any absolute soil moisture a self-propelled power-operated vehicle is used which is capable of operating on tires having an ultra-low pressure of 5-60 kPa and/or with a pressure on the ground of less than 60 kPa, and power-operated vehicles with a pressure on the soil of more than 60 kPa are only used at an absolute soil moisture of less than 26%.

A further variant of the method for cultivating crops is the method including the technological operations of sowing and harvesting, in which according to the invention, in technological operations performed on the field, at any absolute soil moisture a self-propelled power-operated vehicle is used which is capable of operating on tires having an ultra-low pressure of 5-60 kPa and/or with a pressure on the ground of less than 60 kPa, and power-operated vehicles with a pressure on the soil of more than 60 kPa are only used at an absolute soil moisture of less than 1% of physical maturity of the soil.

A further variant of the method for cultivating crops is the method for cultivating crops including the technological operations of sowing and harvesting, in which according to the invention, in all technological operations performed on the field, a self-propelled power-operated vehicle is used which is capable of operating on tires having an ultra-low pressure of 5-60 kPa and/or with a pressure on the ground of less than 60 kPa, and power-operated vehicles with a pressure on the soil of more than 60 kPa are used not more than 4 times per season.

A further variant of the method for cultivating crops is the method for cultivating crops including the technological operations of sowing and harvesting, in which according to the invention, in all technological operations performed on the field, a self-propelled power-operated vehicle is used which is capable of operating on tires having an ultra-low pressure of 5-60 kPa and/or with a pressure on the ground of less than 60 kPa, and power-operated vehicles with a pressure on the soil of more than 60 kPa are only used for harvesting.

A further variant of the method for cultivating crops is the method for producing crops including the technological operations of sowing and harvesting, in which according to the invention, in more than three different technological operations, a self-propelled power-operated vehicle is used which is capable of operating on tires having an ultra-low pressure of 5-60 kPa and/or with a pressure on the ground of less than 60 kPa, and power-operated vehicles with a pressure on the soil of more than 60 kPa are only used at an absolute soil moisture of less than 26%.

A further variant of the method for cultivating crops is the method for producing crops including the technological operations of sowing and/or spreading of fertilizer and/or spraying of crops, in which according to the invention, the operations of loosening the soil and/or processing the soil and/or cultivation and/or mowing and/or threshing and/or harvesting of crops and/or preparation of the soil and/or applying subsurface fertilizer and/or mechanically eliminating weeds and/or pests and/or mulching and/or agricultural transport operations and/or soil slitting and/or leveling/ loosening and/or rolling and/or hilling and/or ridging and/or moisture detention are carried out by a self-propelled power-operated vehicle which is capable of operating on tires having an ultra-low pressure of 5-60 kPa and/or with a pressure on the ground of less than 60 kPa, at an absolute soil moisture of up to 70%.

The proposed method is realized by a transport and technological assembly mainly for agricultural purposes, including a self-propelled power-operated vehicle on ultra-low pressure tires operating, inter alia, at a pressure of 5 to 60 kPa and/or exerting a pressure of less than 60 kPa on the soil, which, according to the invention, is equipped with a discharging and/or lifting device.

Moreover, the discharging device has a discharging wheel (wheels) realized on an ultra-low pressure tire operating, inter alia, at a pressure of 5 to 60 kPa.

Moreover, the discharging wheels are equipped with an adjusting device for the processing width.

Moreover, the discharging wheel or wheels are mounted on the aggregate equipment.

Moreover, the transport and technological assembly mainly for agricultural purposes is equipped with a system for lifting and lowering the discharging device or the discharging wheels and/or the aggregate equipment.

Moreover, the transport and technological assembly is equipped with a system for lifting and lowering the discharging device or the discharging wheels and/or the aggregate equipment, which is equipped with a hydraulic drive or a hydraulic cylinder.

Moreover, the discharging device and/or the universal lifting-hitching device and/or the aggregate equipment is configured so that it can be turned.

Moreover, the discharging device is configured in the form of a semi-trailer on ultra-low pressure tires operating, inter alia, at a pressure of 5 to 60 kPa.

Moreover, on the transport and technological assembly, a harrow or cultivator or sower or fertilizer applicator or binder or mower or thresher or plow is used as aggregate equipment.

The entirety of said features makes new properties possible, i.e. by applying said features the following advantages are rendered possible:

reducing loss of the spring soil moisture reserves (since the activities are carried out in the period when the absolute soil moisture is more than 2% higher than the upper moisture limit of physical maturity of the soil and most of it remains in the soil), optimizing the periods of sowing activities, (since the activities are carried out in the period when the absolute soil moisture is more than 2% higher than the upper moisture limit of physical maturity of the soil, i.e. in the period when it is optimal for certain crops, e.g. barley, according to agrotechnical parameters).

obtaining strong shoots (due to the optimal sowing period and sprouting of seeds at increased soil moisture), shifting the periods of sowing activities forward to an earlier period (since the activities are carried out in the period when the absolute soil moisture is more than 2% higher than the upper moisture limit of physical maturity of the soil), reducing the dependence of sowing activities on soil conditions (since the proposed agricultural assembly for soil processing allows the performance of agricultural activities inter alia in the period when the absolute soil moisture is more than 2% higher than the upper moisture limit of physical maturity of the soil), increasing the environmental friendliness of agricultural production, and consequently of the produced sown crops (as a result of the overall reduction of the use of herbicides and mineral fertilizers, but with an increased yield of sown crops), reducing the negative impact of the agricultural assembly on the soil and of the soil on parts of the assembly (due to the reduction of the total weight of the sowing assembly and the specific pressure on the soil, the soil is less compacted, and since the soil is moister it has a weaker impact on the parts of the assembly), increasing the speed of sowing activities (which is facilitated since the soil offers less resistance to the operating parts of the assembly), increasing the period of vegetative development of crops (which is facilitated since the agricultural activities are carried out earlier), reducing the specific fuel consumption (due to the increased speed when agricultural activities are carried out and since the soil offers less resistance to the operating parts of the assembly), reducing the mass and dimensions of the sowing assembly (this becomes possible due to reduced loads on the parts of the assembly), and expanding the functionalities of the agricultural assembly while performing activities with minimal pressure on the soil (since it is equipped with a power-operated vehicle on ultra-low pressure tires operating, inter alia, at a pressure of 5 to 60 kPa and/or exerting a pressure of less than 60 kPa on the soil, with a universal lifting-hitching device and/or a discharging device which allows the use of an entire range of agricultural technological equipment).

The main effect is that if no soil compacting procedures are performed on the field, the soil will attain its natural density within a few years which is comfortable for the existence of all types of necessary bacteria and other living creatures, which leads to increased fertility.

In this way, the entirety of the proposed features makes new properties possible, i.e. by applying said features it is possible to reduce the loss of spring moisture, it becomes possible to optimize the sowing periods, to significantly reduce soil compaction by agricultural assemblies almost to the pristine level, which altogether leads to an increased efficiency of agricultural activities, an increased yield while reducing the amount of applied chemicals, and increased environmental friendliness.

Consequently, the proposed invention meets the criteria of "novelty" and "inventive step".

BRIEF DESCRIPTION OF THE DRAWINGS

The proposed technical solutions are shown schematically in the figures, in which.

DETAILED DESCRIPTION

Figure 1:
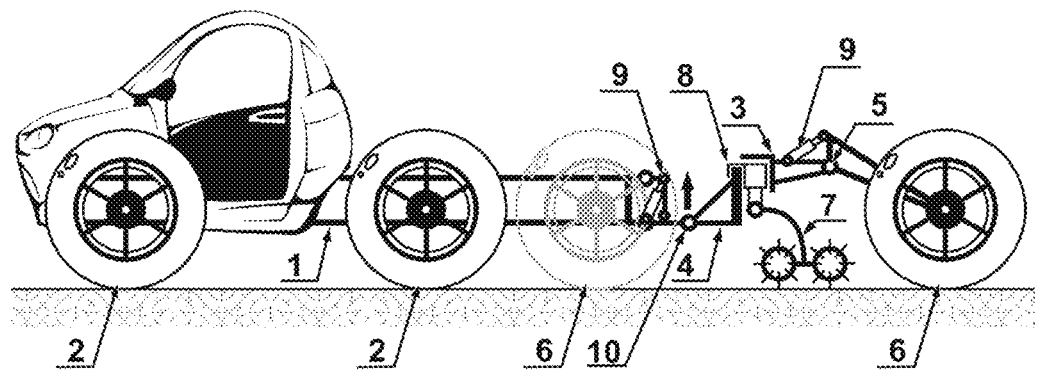
FIG. 1 shows a self-propelled power-operated vehicle on ultra-low pressure tires, equipped with universal lifting, hitching and discharging devices with a hydraulic cylinder and discharging wheels equipped with an adjusting device for the processing width.

The following designations are used in the figures:
1 self-propelled, power-operated vehicle on ultra-low pressure tires,
2 ultra-low pressure tire,
3 universal lifting device,
4 hitching device,
5 discharging device,
6 discharging wheel,
7 aggregate equipment,
8 adjusting device for the processing width,
9 hydraulic cylinder,
10 turning device,
11 semi-trailer The transport and technological assembly for agricultural purposes (FIG. 1) includes a self-propelled power-operated vehicle 1 on ultra-low pressure tires 2 operating, inter alia, at a pressure of 5 to 60 kPa and/or exerting a pressure of less than 60 kPa on the soil. It is equipped with a universal lifting 3 and hitching device 4 and discharging device 5, which includes a discharging wheel 6, (mounted on the aggregate equipment 7), realized on an ultra-low pressure tire operating, inter alia, at a pressure of 5 to 60 kPa, (in a variant with two discharging wheels, they are equipped with an adjusting device for the processing width 8). The system of discharging wheels is equipped with a hydraulic cylinder 9.

Figure 2:
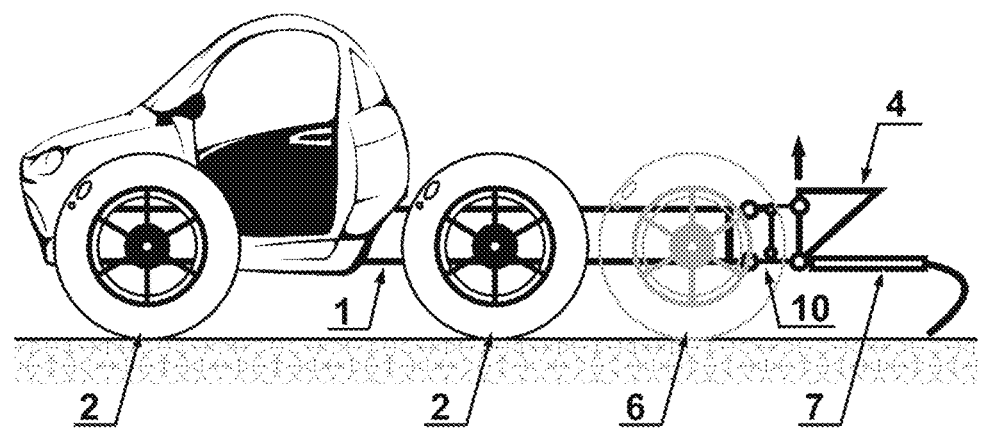
FIG. 2 shows a self-propelled power-operated vehicle on ultra-low pressure tires, equipped with a universal lifting-hitching device and a discharging device (configured so that the aggregate equipment can be turned).

A variant is possible, wherein the discharging device is configured so that the aggregate equipment can be turned (see FIG. 2), where the turning device 10 is shown.

Figure 3:
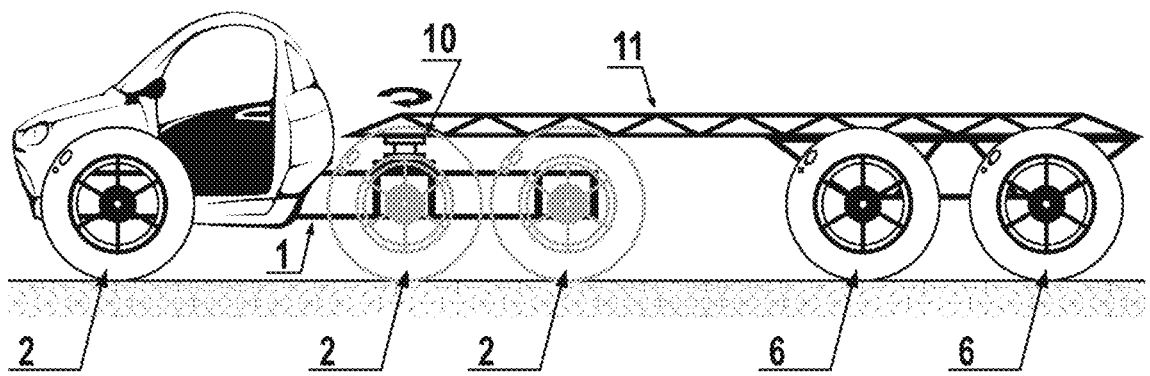
FIG. 3 shows a self-propelled power-operated vehicle on ultra-low pressure tires, equipped with a discharging device configured in the form of a semi-trailer on ultra-low pressure tires operating, inter alia, at a pressure of 5 to 60 kPa.
Figure 4:
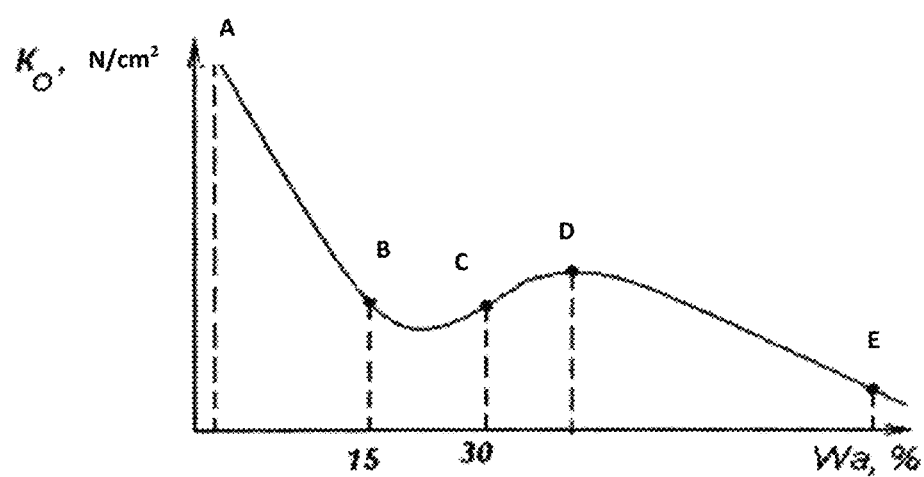
FIG. 4 shows resistance to mechanical processing in relation to soil moisture.

A variant of the assembly, wherein the discharging device is configured in the form of a semi-trailer 11 on ultra-low pressure tires operating, inter alia, at a pressure of 5 to 60 kPa, is shown in FIG. 3.

The technical solution fulfills the criterion of "industrial applicability" as shown by the examples given below of the specific use of the proposed invention.

The proposed method of agricultural activities was tested through the example of sunflower crops on the farm "UNI" LLC in the Olkhovatsky District of the Voronezh Region. To increase the reliability of the experiment, a field with a total area of 123 hectare (ha) was divided into two sections. In the first section of the field, sunflower cultivation was carried out in a traditional way, and in the second one according to the proposed invention.

Both according to the proposed and traditional method, the soil was to be prepared in autumn, including plowing and the elimination of weeds. However, in the spring period before sowing, no operations at all were to be carried out on the soil. Sowing was carried out on the soil prepared in autumn, immediately when weeds were sprouting, without prior cultivation. The sowing activities in the field section cultivated using the proposed method were completed 18 days earlier than with the traditional method (since the soil temperature at that time reached an optimum for the development of cold-resistant sunflower seeds), and immediately after the rain, at a soil moisture of 50%.

Within 5 days after sowing, using a universal transport and technological vehicle on ultra-low pressure tires "Bars-271", chemical treatment with continuously acting herbicides was carried out. The wheeled propeller of said vehicle exerts a pressure of about 17 kPa on the soil, and therefore no tracks were formed; consequently, at a seed placement depth of about 5 cm the germinating sprouts of the seeds in the soil were not injured.

Chemical weeding before sprouting allowed to eliminate weeds and not to suppress the growth of cultivated plants. High efficiency of the chemical treatment was achieved by the use of a low volume sprayer with a flow rate of working fluid of 20-60 l/ha. Withered weeds created a "parasol" on top of the soil, which protects the space between the rows from direct sunlight, and consequently reduces the evaporation of moisture and soil cracking, and also prevents the growth of a second wave of weeds.

The sunflowers on the second section of the field ripened 10 days earlier than with the traditional method. The sunflowers ripened earlier since the seeds were placed in the soil having the optimal temperature; there was no direct contact of the cultivated plants with herbicide; withered weeds did not allow the soil to be heated up significantly and to crack, and therefore the moisture in the soil was preserved.

According to the traditional method, chemical treatment was carried out after sunflower sprouting, by a self-propelled sprayer, and the soil was not protected from sunlight. It is to be noted that it did not rain at all in the area of this field over the entire summer period. The soil was covered with deep cracks in this section.

The crop yield in the field section cultivated according to the proposed method amounted to 22.39 dt/ha (dt/ha=100 kilograms per hectare), and to 9.1 dt/ha in the section cultivated traditionally; thus, the difference in crop yield was 13.29 dt/ha.

In addition, the proposed method was tested in NPF [Nauchno-Proizvodstvennaja Firma/Research and Production Company] "Belagrospetsmash", a developer and manufacturer of agricultural appliances on ultra-low pressure tires. NPF "Belagrospetsmash" is also seriously engaged in research, both of the appliances and the agricultural production technologies on which they are based.

In the agricultural season of 2017, the following tests were carried out on the experimental field of NPF.

The bean crop lupin was chosen as test crop. In spring, after snowmelt and after the weeds have begun to form root systems, at an absolute soil moisture of about 65%, the soil surface was loosened and weed germs were removed. For this activity, a self-propelled power-operated vehicle was used which is capable of operating on tires having an ultra-low pressure of 5-60 kPa and with a pressure on the ground of less than 60 kPa, UTES-271 "Bars" manufactured by NPF "Belagrospetsmash", with a milling cutter as aggregate (also developed by NPF "Belagrospetsmash"), and equipped with discharging and lifting devices, and discharging wheels realized on ultra-low pressure tires operating, inter alia, at a pressure of 5 to 60 kPa with a possibility of adjusting the processing width (for choosing the appropriate track size and minimal pressure and minimal damage on the crops). The discharging device is configured so that it can be turned (which is important for reducing the length of the turning circle, and consequently for reducing soil compaction). It is connected with the lifting device by a hydraulic cylinder (when it is actuated and the milling cutter is transferred to the transport position, inter alia during turning, the pressure inside the tire changes from 5 to 55 kPa, the contact patch increases, and there is no increase in soil compaction).

As a result of the performed activities, all weeds having begun to grow were eliminated, and due to the use of the transport and technological assembly including a self-propelled power-operated vehicle on ultra-low pressure tires operating, inter alia, at a pressure of 5 to 60 kPa exerting a pressure of less than 60 kPa on the soil, aggregate equipment and the presence of discharging and lifting devices, at this stage, no significant soil compaction occurred despite the very high soil moisture.

The next activity for carrying out the proposed method was sowing which was performed when the soil temperature had warmed up to the minimum value for the respective crop. For sowing, a self-propelled power-operated vehicle was also used which is capable of operating on tires having an ultra-low pressure of 5-60 kPa and with a pressure on the ground of less than 60 kPa, and the sower "Lyubava" (developed and manufactured by NPF "Belagrospetsmash") was used as a sowing machine. Soil moisture during sowing was very high, about 70%. In addition, it was raining heavily. However, due to the use of the proposed assembly and the possibility of operating at increased moisture with a minimal compacting effect on the soil, productivity was increased owing to higher speed (the moisture turned into a lubricant, soil density decreased, and the negative impact of friction on the coulters was reduced). Since there was practically no soil compaction (as compared to the traditional technology) and sowing took place in oversaturated soil, the lupin shoots were strong and grew rapidly ("sow in the mud and your wealth will bud" says a Russian proverb).

The next activity for carrying out the proposed method was "harrowing on shoots", since after the lupin shoots second-generation weeds also started to grow. Also for this activity, the UTES-271 "Bars" manufactured by NPF "Belagrospetsmash" was used, with a harrow as aggregate (also developed by NPF "Belagrospetsmash"), and equipped with discharging and lifting devices, and discharging wheels realized on ultra-low pressure tires operating, inter alia, at a pressure of 5 to 60 kPa with a possibility of adjusting the processing width (for choosing the appropriate track size and minimal pressure and minimal damage on the crops).

This activity was performed two more times within the agricultural season so as to eliminate weeds of the third and fourth generations. Although it was performed on shoots, due to the low pressure on the soil, the plants were damaged to an insignificant extent and quickly recovered.

The final step for carrying out the proposed technology was harvesting. However, due to the fact that at present there are no mass-produced harvesting assemblies based on self-propelled power-operated vehicles on ultra-low pressure tires operating, inter alia, at a pressure of 5 to 60 kPa and exerting a pressure of less than 60 kPa on the soil, and prototypes are not able to work on the field with full load, the main part of the crop was harvested by traditional harvesting appliances with a pressure of more than 60 kPa on the soil. Harvesting was carried out at an absolute soil moisture of 22%, which allowed to minimize the detrimental effect on the soil, i.e. soil compaction, (since at such moisture the soil is quite hard and the increased pressure is less of an issue).

As a result of the performed activities when carrying out the proposed invention, a serious economic effect was achieved, namely the production costs on the experimental field were more than two times lower than on the neighboring field cultivated with the traditional method and traditional equipment.

The reasons for this lay in the same technical result that had been achieved by using the proposed method for cultivating crops and the device for its implementation, namely: reducing loss of the spring soil moisture reserves (since the activities were carried out in the period when the absolute soil moisture is more than 2% higher than the upper moisture limit of physical maturity of the soil and most of it remains in the soil), optimizing the periods of sowing activities, (since the activities were carried out in the period when the absolute soil moisture is more than 2% higher than the upper moisture limit of physical maturity of the soil, i.e. in the period when it is optimal according to agrotechnical parameters), obtaining strong shoots (due to the optimal sowing period and sprouting of seeds at increased soil moisture), shifting the periods of sowing activities forward to an earlier period (since the activities were carried out in the period when the absolute soil moisture is more than 2% higher than the upper moisture limit of physical maturity of the soil), reducing the dependence of sowing activities on soil conditions (since the proposed agricultural assembly for soil processing allows the performance of agricultural activities inter alia in the period when the absolute soil moisture is more than 2% higher than the upper moisture limit of physical maturity of the soil), increasing the environmental friendliness of agricultural production, and consequently of the produced sown crops (as a result of the overall reduction of the use of herbicides and mineral fertilizers for said method, but with an increased yield of sown crops. In this experiment, chemicals were not used at all).

reducing the negative impact (compaction) of the agricultural assembly on the soil and of the soil on parts of the assembly (due to the reduction of the total weight of the sowing assembly and the specific pressure on the soil, the soil is less compacted, and since the soil is moister it has a weaker impact on the parts of the assembly), increasing the speed of sowing activities (which is facilitated since the soil offers less resistance to the operating parts of the assembly), increasing the period of vegetative development of crops (which is facilitated since the agricultural activities are carried out earlier), reducing the specific fuel consumption (due to the increased speed when agricultural activities are carried out and since the soil offers less resistance to the operating parts of the assembly), reducing the mass and dimensions of the sowing assembly (this becomes possible due to reduced loads on the parts of the assembly), expanding the functionalities of the agricultural assembly while performing activities with minimal pressure on the soil (since it is equipped with a power-operated vehicle on ultra-low pressure tires operating, inter alia, at a pressure of 5 to 60 kPa and/or exerting a pressure of less than 60 kPa on the soil, with a universal lifting-hitching device and/or a discharging device which allows the use of an entire range of agricultural technological equipment (sower, harrow, sprayer, harvesting assembly, etc.), and increasing the saving of resources when cultivating crops, e.g.:

a) the fuel consumption of UTES-271 "Bars" is 0.2 l/ha [liters per hectare] and the cost of fuel used per shift is 1692 rubles, while the fuel consumption of the self-propelled sprayer John Deere 4930 is 1.2 l/ha and the cost of fuel used per shift is 5200 rubles);

b) savings when transporting water necessary for preparing the mixture: expenses for the transportation of water per shift are 302 rubles for UTES-271 "Bars" and 1646 rubles for the self-propelled sprayer John Deere 4930; and c) saving of herbicides when processing using UTES-271 "Bars" is 20-30%.

What is claimed is:

1. Method for cultivating crops on a field, comprising:
in a technological operation, preparing the field by loosening the soil surface and removing weed germs at an absolute soil moisture of about 65%, thereby avoiding an increase in soil compaction,
in a technological operation subsequent to the preparing, sowing seeds for the crops using an agricultural sowing technology at an absolute soil moisture of about 70% and during rain, and
in a technological operation subsequent to the sowing, harvesting the crops using an agricultural harvesting technology,
wherein all of the technological operations performed on the field beyond at most four per season use exclusively self-propelled, power-operated vehicles which operate on tires having a pressure of 5-60 kPa with a pressure on the ground of the field of less than 60 kPa.

2. Method for cultivating crops, according to claim 1,
wherein all of the technological operations—without exception—performed on the field, starting with the preparing operation prior to the sowing step and ending with the harvesting operation, use exclusively the self-propelled, power-operated vehicles which operate on tires having a pressure of 5-60 kPa with a pressure on the ground of the field of less than 60 kPa.

3. Method for cultivating crops according to claim 1,
wherein all of the technological operations performed on the field other than the harvesting operation use exclusively self-propelled, power-operated vehicles which operate on tires having a pressure of 5-60 kPa with a pressure on the ground of the field of less than 60 kPa.

4. Method for producing crops on a field, according to claim 1,
wherein the technological operations of preparing and harvesting use self-propelled, power-operated vehicles which operate on tires having a pressure of 5-60 kPa with a pressure on the ground of less than 60 kPa, at an absolute soil moisture of up to 70%.

* * * * *